United States Patent [19]

Herold et al.

[11] Patent Number: 5,739,243
[45] Date of Patent: Apr. 14, 1998

[54] POLYMERIZABLE COMPOSITION

[75] Inventors: Robert D. Herold, Monroeville; Charles R. Wiedrich, Murrysville, both of Pa.

[73] Assignee: PPG Industries, Inc., Pittsburgh, Pa.

[21] Appl. No.: 758,612

[22] Filed: Nov. 27, 1996

[51] Int. Cl.$^6$ .................. C08F 222/20; C08F 220/26
[52] U.S. Cl. .................. 526/325; 351/159; 526/320; 526/321; 526/323.1; 526/323.2; 526/326; 526/328.5; 526/329.5; 526/329.6
[58] Field of Search .................. 526/320, 321, 526/323.1, 323.2, 325, 326, 328.5, 329.5, 329.6; 351/159

[56] References Cited

U.S. PATENT DOCUMENTS

| | | | |
|---|---|---|---|
| 3,361,706 | 1/1968 | Meriwether et al. | |
| 3,562,172 | 2/1971 | Ono et al. | 252/300 |
| 3,567,605 | 3/1971 | Becker | 204/158 |
| 3,578,602 | 5/1971 | Ono et al. | 252/300 |
| 3,988,274 | 10/1976 | Masuhara | |
| 4,166,043 | 8/1979 | Uhlmann et al. | 252/300 |
| 4,215,010 | 7/1980 | Hovey et al. | 252/300 |
| 4,306,780 | 12/1981 | Tarumi et al. | 351/159 |
| 4,342,668 | 8/1982 | Hovey et al. | 252/586 |
| 4,351,922 | 9/1982 | Yoshida | 575/116 |
| 4,367,170 | 1/1983 | Uhlmass et al. | 252/586 |
| 4,637,698 | 1/1987 | Kwak et al. | 351/163 |
| 4,816,584 | 3/1989 | Kwak et al. | 544/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,913,544 | 4/1990 | Rickwood | 351/163 |
| 4,931,219 | 6/1990 | Kwiatkowski et al. | 252/586 |
| 4,931,220 | 6/1990 | Haynes et al. | 252/586 |
| 5,066,818 | 11/1991 | Van Gemert et al. | 549/389 |
| 5,238,931 | 8/1993 | Yoshikawa et al. | 514/184 |
| 5,274,132 | 12/1993 | Van Gemert | 549/389 |
| 5,384,077 | 1/1995 | Knowles | 252/586 |
| 5,405,958 | 4/1995 | Van Gemert | 544/71 |
| 5,429,774 | 7/1995 | Kumar | 252/586 |
| 5,442,022 | 8/1995 | Keita et al. | 526/309 |
| 5,466,398 | 11/1995 | Van Gemert et al. | 252/586 |
| 5,545,828 | 8/1996 | Keita et al. | 526/72 |
| 5,556,931 | 9/1996 | Imura et al. | 526/323.1 |
| 5,583,191 | 12/1996 | Kawai | 526/320 |

FOREIGN PATENT DOCUMENTS

| | | |
|---|---|---|
| 62-195383 | 8/1987 | Japan. |
| WO 96/18926 | 6/1996 | WIPO. |
| WO 96/19741 | 6/1996 | WIPO. |
| WO96/340245 | 10/1996 | WIPO. |

*Primary Examiner*—Fred Zitomer
*Attorney, Agent, or Firm*—James R. Franks; Irwin M. Stein

[57] ABSTRACT

Describes polymerizable organic compositions of from about 5 to 90 weight percent of a first monomer component which is an alkoxylated diol, e.g., alkoxylated bisphenol, having acrylate or methacrylate groups, e.g., a dimethacrylate of bisphenol A having 25 to 35 ethoxy units, and from about 10 to 95 weight percent of a second monomer component which is different than the first monomer component and has at least three acrylate or methacrylate groups. There may also be present, from 0 to about 85 weight percent of a third polymerizable monomer component which has a single ethylenically unsaturated group that is polymerizable by free radical initiation. Substantially completely cured polymerizates prepared from such compositions may be used to prepare photochromic articles, e.g., lenses, by incorporating a photochromic substance, e.g., by thermal transfer, into the polymerizate.

20 Claims, No Drawings

POLYMERIZABLE COMPOSITION

DESCRIPTION OF THE INVENTION

The present invention relates to polymerizable organic compositions, polymerizates prepared from such compositions and articles prepared from such polymerizates, particularly articles having organic photochromic substances applied to or incorporated therein. More particularly, the present invention relates to certain polymerizable organic compositions comprising a first monomer component which is an alkoxylated diol, e.g., bisphenol, having terminal acrylate or methacrylate groups, a second monomer component having at least three acrylate or methacrylate groups and optionally a third monomer component that has a single ethylenically unsaturated group which is polymerizable by free radical initiation. Still more particularly, this invention relates to photochromic articles prepared from polymerizates of such polymerizable organic compositions. Photochromic articles prepared in accordance with the present invention have been observed to exhibit an improved photochromic response.

Polymerizable organic compositions based on poly (methyl methacrylate), and polymerizates obtained therefrom are well known in the art. Polymerizates of polymerizable organic compositions based on homopolymers of poly(methyl methacrylate) possess excellent clarity and good hardness. However, amongst other deficiencies, it is difficult to incorporate organic photochromic substances into such polymerizates by diffusion.

Photochromism is a phenomenon involving a change in color of a photochromic substance, or an article containing such a substance, upon exposure to light radiation containing ultraviolet rays, such as ultraviolet radiation contained in sunlight or in the light of a mercury lamp, and a reversion to the original color when the influence of the ultraviolet radiation is discontinued. Discontinuation of the ultraviolet radiation can be achieved for example by storing the photochromic substance or article in the dark or by removing the source of ultraviolet radiation. Recently, photochromic plastic materials, particularly plastic materials for optical applications, have been the subject of considerable attention. In particular, photochromic ophthalmic plastic lenses have been investigated in part due to the weight advantage that they can offer relative to ophthalmic lenses made of glass. In addition, photochromic transparencies for vehicles, such as automobiles and airplanes, have been of interest because of the potential safety features that such transparencies offer.

U.S. Pat. No. 5,556,931 discloses polymerizable compositions comprising at least two ethoxylated bisphenol A dimethacrylate type monomers, the content of which is 30 to 80 mol % having 2 to 3 ethoxy units, 20 to 50 mol % having 6 to 12 ethoxy units, and less than 20 mol % having other than 2 to 3 and 6 to 12 ethoxy units. U.S. Pat. No. 5,545,828 discloses organic ophthalmic lenses prepared from the copolymerization of, in part, a component comprising at least 50% by weight of an ethoxylated bisphenol A dimethacrylate type monomer having 0 to 10 ethoxy units. U.S. Pat. 5,442,022 discloses a composition obtained by polymerization of a polymerisable composition comprising, in part, at least 50% by weight of an ethoxylated bisphenol A dimethacrylate type monomer, or mixture of such monomers, having 0 to 10 ethoxy units. U.S. Pat. No. 4,306,780 discloses a high refractive index lens obtained by copolymerization of, in part, one or more of a first monomer component which is an ethoxylated bisphenol A dimethacrylate type monomer having 0 to 8 ethoxy units. Example 14 of the U.S. Pat. No. 4,306,780 patent discloses the combination of bisphenol A dimethacrylate (BPDMA) with phenylmethacrylate and CR-39® diethyleneglycol bis(allyl carbonate) monomer.

International patent publication WO 96/19741 discloses organic photochromic materials consisting of a polymer matrix of optical quality and of at least one dye that imparts photochromic properties to the matrix. The polymer constituting the matrix is a copolymer of 30 to 95 weight % ethoxylated bisphenol A dimethacrylate having 2 to 4 ethoxy units and 5 to 70 weight % of a polyurethane oligomer having terminal di- or triacrylic or di- or trimethacrylic functionality. International patent publication WO 96/18926 discloses photochromic transparent organic materials particularly useful for the production of photochromic organic ophthalmic lenses. The organic materials are chosen from homopolymers of ethoxylated bisphenol A dimethacrylate having 2 to 4 ethoxy units, and copolymers of such dimethacrylates and at most 30 weight % of an aromatic monomer with vinyl; acrylic or methacrylic functionality.

The above patents and patent applications do not disclose a polymerizable organic composition consisting essentially of an ethoxylated bisphenol A dimethacrylate type monomer component having from 15 to 70 ethoxyunits, present in an amount of from 5% to 90% by weight, based on the total weight of monomer components, in combination with from 10% to 95% by weight of a monomer which has at least three acrylate or methacrylate groups and optionally from 0% to 85% by weight of a monomer which has a single ethylenically unsaturated group which is polymerizable by free radical initiation.

It has now been discovered that substantially completely cured polymerizates prepared from polymerizable organic compositions of the present invention show improved physical properties, such as flexibility and abrasion resistance, compared to polymerizates obtained from homopolymers of poly(methyl methacrylate). It has further been discovered that photochromic articles, prepared from polymerizates made in accordance with the present invention have an improved photochromic response compared to photochromic articles prepared from homopolymers of poly(methyl methacrylate).

Polymerizable organic compositions according to the present invention consist essentially of from 5% to 90% by weight, based on the total weight of monomer components, of a first monomer component, which is represented by the following general formula I:

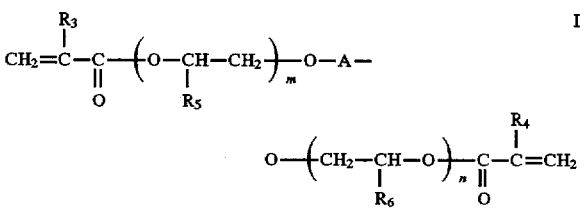

wherein m and n are each a positive number, the sum of m and n being from 15 to 70. $R_3$ and $R_4$ are each hydrogen or methyl. $R_5$ and $R_6$ are each hydrogen or $C_1$ to $C_2$ alkyl. A is a divalent linking group selected from the group consisting of straight or branched chain alkylene (usually containing from 1 to 8 carbon atoms), phenylene, $C_1$–$C_9$ alkyl substituted phenylene and a group represented by the following general formula II,

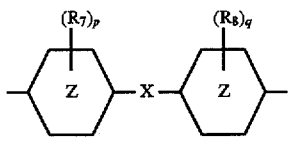  II wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$) (C$_6$H$_5$)— or

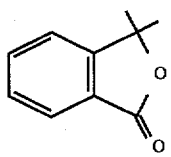

when

is the divalent benzene group, and X is O, S, —CH$_2$—, or —C(CH$_3$)$_2$— when

is the divalent cyclohexane group; and from 10% to 95% by weight, based on the total weight of monomer components, of a second monomer component which is different than the first monomer component, the second monomer component being represented by the following general formula III,

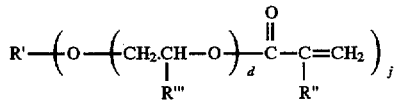  III wherein R' is a radical derived from a polyol, R" is hydrogen or methyl, preferably methyl, R''' is hydrogen or $C_1$ to $C_2$ alkyl, preferably hydrogen or methyl, more preferably hydrogen, d is a number from 0 to 20, preferably 0 to 10, more preferably 0, and j is a whole number from 3 to 6, preferably 3 to 4 and more preferably 3.

Polymerizable organic compositions according to the present invention may have also present from 0% to 85% by weight, based on the total weight of monomer components, of a third monoethylenically unsaturated monomer component that is polymerizable by free radical initiation.

As used herein with regard to e and f, m and n, and d, unless otherwise stated, "number" meant to mean "average number". Other than in the operating examples, or where otherwise indicated, all numbers expressing quantities of ingredients or reaction conditions used herein are to be understood as modified in all instances by the term "about".

DETAILED DESCRIPTION OF THE INVENTION

In accordance with the present invention, there are provided certain polymerizable organic compositions consisting essentially of, in part, a first monomer component as defined above with respect to general formula I. Preferably the first monomer component is present in an amount of from 5% to 75%, and more preferably from 10% to 60% by weight, based on the total weight of monomer components.

A particularly preferred first monomer component can be defined with reference to general formula I, wherein the sum of m and n is from 20 to 40, e.g., 25 to 35, $R_3$ and $R_4$ are each methyl, $R_5$ and $R_6$ are each hydrogen, and A is a divalent linking group according to general formula II wherein

represents a divalent benzene group, p and q are each O, and X is —C(CH$_3$)$_2$—.

The first monomer component may be prepared by methods which are well known in the art. One such commonly used method involves a two-step process. In the first step, a polyol, e.g., 4,4'-isopropylidenediphenol, is reacted with an oxirane containing substance, for example ethylene oxide, propylene oxide, α-butylene oxide or β-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha—beta unsaturated acid or ester such as methacrylic acid, an alkyl methacrylate, an acrylic acid, an alkyl acrylate, or a combination thereof. The second step results in the formation of the first monomer component.

Examples of polyols suitable for use in the first step of preparing the first monomer component include: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, 4-hydroxybenzyl alcohol, and 3,5-bis(1,1-dimethylethyl)-4-hydroxybenzenemethanol; dihydroxybiphenyls such as 4,4'-dihydroxybiphenyl and 2,2'dihydroxybiphenyl; bisphenols such as 4,4'-isopropylidenediphenol; 4,4'-oxybisphenol; 4,4'-dihydroxybenzenephenone; 4,4'-thiobisphenol; phenolphthlalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidenebiscyclohexanol; 4,4'-oxybiscyclohexanol; 4,4'-thiobiscyclohexanol; and bis(4-hydroxycyclohexanol)methane.

The polymerizable organic composition of the present invention includes also a second monomer component as defined with reference to general formula III. Preferably the second monomer component is present in an amount of from 10% to 90% and more preferably from 10% to 80% by weight, based on the total weight of monomer components.

A particularly preferred second monomer component can be defined with reference to general formula III, wherein the polyol from which R' is derived is trimethylolpropane, R" is methyl, d is 0, and j is 3.

When d is greater than 0, the second monomer component may be prepared by methods that are well known in the art. One such commonly used method involves a two step process. In the first step, a polyol, e.g., trimethylolpropane, is reacted with an oxirane containing substance, for example ethylene oxide, propylene oxide, $\alpha$-butylene oxide or $\beta$-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha—beta unsaturated acid or ester such as methacrylic acid, an alkyl methacrylate, an acrylic acid, an alkyl acrylate, or a combination thereof. The second step results in the formation of the second monomer component.

Examples of polyols from which R' may be derived include, trimethylolpropane, 1,2,4-benzenetriol, 3,5-dihydroxybenzyl alcohol, glycerine, tris-(2-hydroxyethyl) isocyanurate, pentaerythritol, di-trimethylolpropane, and di-pentaerythritol.

The polymerizable organic composition of the present invention may include also at least one-third monoethylenicaly unsaturated monomer component that is polymerizable by free radical initiation. As used herein, "ethylenically unsaturated" is meant to include allylic unsaturation, alpha—beta ethylenic unsaturation, and vinyl unsaturation. Preferably the third monomer component, or mixtures of third monomer components, is (are) present in an amount of from 0% to 80% and more preferably from 0% to 70% by weight, based on the total weight of monomer components.

The ethylenically unsaturated group of the third monomer component is preferably an alpha—beta ethylenic unsaturated group, e.g., methacrylate or acrylate. Examples of suitable monomers which may be used as the third monomer component include: acrylic acid, methacrylic acid, esters of acrylic acid such as methyl acrylate and 2-hydroxyethyl acrylate, esters of methacrylic acid, such as methyl methacrylate, phenoxyethyl methacrylate, isobornyl methacrylate, cyclohexyl methacrylate and 2-hydroxyethyl methacrylate, vinyl esters such as vinyl acetate, and styrene. In the present invention, examples of particularly preferred third monomer components include methyl methacrylate and phenoxyethyl methacrylate.

Polymerization of the polymerizable organic composition of the present invention may be accomplished by adding to the composition an initiating amount of material capable of generating free radicals, such as organic peroxy compounds or azobis(organonitrile) compounds, i.e., an initiator. Methods for polymerizing free radical polymerizable compositions are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate.

Examples of suitable azobis(organonitrile) compounds, that may be used as thermal polymerization initiators include: azobis(isobutyronitrile) and azobis(2,4-dimethylvaleronitrile). A preferred thermal initiator is azobis (2,4-dimethylvaleronitrile).

The amount of thermal polymerization initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred thermal initiator, azobis(2,4-dimethylvaleronitrile), typically between 0.01 and 3.0 parts of that initiator per 100 parts of the polymerizable organic composition (phm) may be used. More usually, between 0.05 and 1.0 phm is used to initiate the polymerization. Typically, the thermal cure cycle involves heating the polymerizable organic composition in the presence of the initiator from room temperature to from 85° C. to 125° C. over a period of from 2 hours to 30 hours.

Photopolymerization of the polymerizable organic composition according to the present invention may be carried out in the presence of a photopolymerization initiator using ultraviolet light, visible light, or a combination thereof. Examples of suitable photopolymerization initiators include benzoin, benzoin methyl ether, benzoin isobutyl ether benzophenol, acetophenone, 4,4'-dichlorobenzophenone, diethoxyacetophenone, 2-hydroxy-2methyl-1-phenylpropan-1-one, 1-hydroxycyclohexyl phenyl ketone, 2-isopropylthixanthone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. The photopolymerization initiator is typically used in an amount from 0.01% to 2% by weight, based on the weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator, and the consequent cure cycle should be adequate to produce a polymerizate according to the present invention having a 0 second Barcol hardness of at least 1, preferably, at least 4, e.g., from 4 to 35.

Various conventional additives may be incorporated with the polymerizable organic composition of the present invention. Such additives may include light stabilizers, heat stabilizers, antioxidants, ultraviolet light absorbers, mold release agents, static (non-photochromic) dyes, pigments, polymerization inhibitors to promote stability during storage, and ultraviolet light absorbers (other than the photochromic compounds). In addition, it is contemplated that a form of organic photochromic substance resistant to the effects of the initiator may also be added to the polymerizable organic composition of the present invention. Such organic photochromic substances include photochromic pigments and photochromic compounds encapsulated in metal oxides, the latter of which are described in U.S. Pat. Nos. 4,166,043 and 4,367,170. Antiyellowing additives, e.g., 3-methyl-2-butenol, organo pyrocarbonates and triphenyl phosphite [CAS 101-02-0], may also be added to polymerizable organic compositions of the present invention to enhance resistance to yellowing.

It is also contemplated that a polymerization moderator, or mixtures of polymerization moderators, may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, 1,3-diisopropenylbenzene, alpha-methylstyrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable organic composition of the present invention in an amount from 0.01% to 20% by weight, preferably from 0.1% to 10% by weight and more preferably from 0.3% to 5% by weight, based on the total weight of polymerizable organic composition.

It is further contemplated that a flexibilizing additive having no radically polymerizable groups, henceforth referred to as a nonpolymerizable flexibilizing additive, may be added to polymerizable organic compositions of the present invention. The nonpolymerizable flexibilizing additive, or mixtures of nonpolymerizable flexibilizing additives, may be added in an amount of from 0.05% to 15%, preferably from 0.5% to 10% and more preferably from 2% to 6% by weight, based on the total weight of the monomer components and the weight of the nonpolymerizable flexibilizing additive(s). The nonpolymerizable flexibilizing additive may be nonaromatic or aromatic.

Examples of suitable nonpolymerizable flexibilizing additives include, alkoxylated phenol benzoate, alkoxylated naphthol benzoate, 1,3-bis(phenylthio)propane, bis (phenylthio) alkylene ether, the reaction product of phenyl chloroformate and dimercaptan, the reaction product of dimercaptan and phosgene endcapped with phenol, cinnamates, triphenyl phosphite, tri(2-ethylhexyl) trimellitate, triisodecyl trimellitate, poly(alkylene glycol) dinaphthoate, 2-ethylhexyl diphenylphosphate, isodecyl diphenyl phosphate, tricresyl phosphate, poly(alkylene glycol) dibenzoates, e.g., poly(ethylene glycol) dibenzoate and poly(propylene glycol) dibenzoate, esters of phthalic acid, isophthalic acid, and terephthalic acid, e.g., dioctyl phthalate, and a member represented by the following general formula IV:

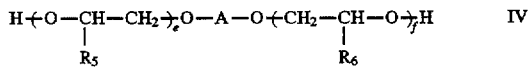

wherein e and f are each a positive number, the sum of e and f being from 0 to 70, $R_5$ and $R_6$ are each hydrogen or $C_1$ to $C_2$ alkyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by general formula II,

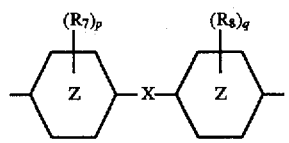

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —CH$_2$—, —C(CH$_3$)$_2$—, —C(CH$_3$) (C$_6$H$_5$)— or

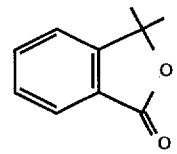

when

is the divalent benzene group, and X is O, S, —CH$_2$—, or —C(CH$_3$)$_2$— when

is the divalent cyclohexane group.

Nonpolymerizable flexibilizing additives, described with reference to general formula IV where the sum of m and n is greater than 0, may be prepared by methods which are well known in the art. One such commonly used method involves reacting a polyol, e.g., 4,4'-isopropylidenediphenol with an oxirane containing substance, e.g., ethylene oxide, propylene oxide, α-butylene oxide or β-butylene oxide, to form the nonpolymerizable flexibilizing additive represented by general formula IV.

Examples of suitable polyols, for preparing nonpolymerizable flexibilizing additives represented by general formula IV wherein the sum of e and f is greater than 0, or for use as the nonpolymerizable flexibilizing additive wherein the sum of e and f is 0, include those described with respect to the first step of preparing the first monomer component, exclusive of 4,4'-(1,2-ethenediyl)bisphenol.

A preferred nonpolymerizable flexibilizing additive may be defined with reference to general formula IV wherein the sum of e and f is from 25 to 35, $R_5$ and $R_6$ are each hydrogen, and A is a divalent linking group according to general formula II, wherein

represents a divalent benzene group, p and q are each 0 and X is —C(CH$_3$)$_2$—. Another preferred nonpolymerizable flexibilizing additive is poly(ethylene glycol) dibenzoate, the poly(ethylene glycol) precursor of which has a number average molecular weight of from 100 to 1000 grams/mole.

Polymerizates obtained from polymerization of polymerizable organic compositions of the present invention are solid and preferably transparent or optically clear so that they may be used for optical lenses, such as plano and ophthalmic lenses, sun lenses, windows, automotive transparencies, e.g., windshields, T-roofs, sidelights and backlights, and for aircraft transparencies, etc. When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form.

Photochromic compounds that may be utilized with the polymerizable organic compositions or polymerizates of the present invention are organic photochromic compounds or substances containing same. These photochromic compounds may be added to such compositions prior to curing. Also, these photochromic compounds may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, blueish-green, or blueish-purple color when exposed to ultraviolet light in an appropriate solvent or matrix. Many of such compounds are described in the open literature. For example, spiro(indoline)naphthoxazines have been described, among others, in U.S. Pat. Nos. 3,562,172; 3,578,602; 4,215,010; and 4,342,668. Spiro(indoline)naphthoxazines having certain substituents at the 8' and 9' positions of the naphthoxazine portion of the molecule are described in U.S. Pat. No. 5,405,958. Spiro(indoline)pyridobenzoxazines are described in U.S. Pat. No. 4,637,698. Spiro(benzindoline) pyridobenzoxazines and spiro(benzindoline)naphthoxazines are described in U.S. Pat. No. 4,931,219. Spiro (benzindoline)naphthopyrans are described in Japanese Patent Publication 62/195383. Spiro(indoline)benzoxazines are described in U.S. Pat. No. 4,816,584. Spiro(indoline) benzopyrans, spiro(indoline)naphthopyrans and spiro (indoline)quinopyrans are described, for example, in U.S. Pat. No. 4,880,667. Benzopyrans and naphthopyrans having a nitrogen-containing substituent at the 2-position of the pyran ring are described in U.S. Pat. No. 4,818,096. Spiro (indoline)pyrans are also described in the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum present within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithzonates, i.e., (arylazo)thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic compounds in the aforedescribed patents are incorporated herein, in toto, by reference. The photochromic articles of the present invention may contain one photochromic compound or a mixture of photochromic compounds, as desired. Mixtures of photochromic compounds may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic compounds. The relative amounts of the aforesaid photochromic compounds used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

The present invention is more particularly described in the following examples, which are intended as illustrative only, since numerous modifications and variations therein will be apparent to those skilled in the art. Unless otherwise specified, all parts and all percentages are by weight.

EXAMPLES 1–3

Table 1 describes three polymerizable monomer compositions. Example 3 is representative of an embodiment of the present invention. Examples 1 and 2 are comparative examples.

TABLE 1

| Example | 1 | 2 | 3 |
|---|---|---|---|
| Basic Ingredients, Parts | | | |
| SR-9036 monomer[a] | 0 | 0 | 40 |
| SR-350 monomer[b] | 0 | 33 | 20 |
| Methyl methacrylate | 100 | 67 | 40 |
| 1-isopropyl-4-methyl-1,4-cyclohexadiene | 0.3 | 0.3 | 0.3 |
| tertiary-butylperoxy 2-ethylhexyl carbonate | 0.15 | 0.15 | 0.15 |
| Vazo ® 52 initiator[c] | 0.1 | 0.1 | 0.1 |

[a]SR-9036 monomer, obtained from Sartomer Inc., is a bismethacrylate of ethoxylated 4,4'-isopropylidenediphenol having an average of 30 moles of ethylene oxide.
[b]SR-350 monomer, obtained from Sartomer Inc., is trimethylolpropane trimethacrylate
[c]Vazo ® 52 initiator, obtained from E.I. Dupont de Nemours, is azobis (2,4-dimethylvaleronitrile).

Cast sheets of the polymerizable monomer compositions of Table 1 were made in the following manner. Each monomer composition was transferred to a suitable vessel and the designated amounts of tertiary-butylperoxy 2-ethylhexyl carbonate and Vazo®52 initiator were added. The resulting initiated polymerizable monomer compositions were separately mixed using a magnetic stir plate and magnetic stir bar at ambient temperature. The initiated monomer compositions were then filtered through a 0.45 micron MAGNA nylon filter using a 316 stainless steel 1.5 liter pressure filter holder, under 20 pounds per square inch (138 kPa) of nitrogen gas. The resulting filtered compositions were degassed for 5 to 10 minutes at 125 Torr, then poured into glass molds having interior dimensions of 15.24×15.2.4×0.32 cm. The filled molds were then placed in an oven and cured using the cure cycle described in Table 2. Physical properties of the sheets were measured and the results are tabulated in Table 3.

TABLE 2*

| Cure Cycle | |
|---|---|
| Cure Cycle For Examples 1–3 | |
| Cumulative Hours | Oven Temperature °C. |
| 0 | 55 |
| 8 | 55 |
| 14 | 125 |
| 15 | 125 |
| 16.5 | 80 (end of cycle) |

*The rate of temperature change represented in Table 2 was, in all instances, linear.

TABLE 3

| Physical Data | | | |
|---|---|---|---|
| Example | 1 | 2 | 3 |
| Physical Test | | | |
| Heat Distortion Temperature[d] (°C. at 10 mils) | ND[1] | ND[1] | 46 |
| Total Deflection at 130° C.[e] (mm) | ND[1] | ND[1] | 0.965 |
| Barcol Hardness (0 Seconds)[f] | 55 | 60 | 6 |
| Barcol Hardness (15 seconds)[f] | 50 | 56 | 0 |
| Fischer Microhardness, (N/mm$^2$)[g] | 190 | 215 | 56 |
| Refractive Index[h] ($n_d^{20}$) | ND[1] | ND[1] | 1.5064 |
| Abbe Number | ND[1] | ND[1] | 53 |
| % Transmitance[i] | 93.9 | 93.8 | 93.8 |
| Yellowness Index[j] | 0.42 | 1.11 | 0.65 |
| Density at 25° C. (g/cc) | ND[1] | ND[1] | 1.197 |
| Young's Modulus, (GPa)[k] | 4.33 | 4.65 | 1.27 |

[1]ND= Not Determined.
[d]The Heat Distortion Temperature was measured, at a deflection of 254 microns (10 mils), in accordance with ASTM D 648-86 using a Custom Scientific Instruments Model HDV3 DTUL/Vicat Softening Point Apparatus.
[e]Total Deflection at 130° C. was determined in accordance with ASTM D 648-86 using a Custom Scientific Instruments Model HDV3 DTUL/Vicat Softening Point Apparatus.
[f]Barcol Hardness was determined in accordance with ASTM - D 2583-81, taking scale readings immediately after the Barcol impresser point penetrated the specimen, and 15 seconds thereafter.
[g]Fischer Microhardness (N/mm$^2$) was determined, using a Fischer Scope H-100 instrument, in accordance with the instrument manufacture's instructions.
[h]Refractive Index $n_d^{20}$ was determined in accordance with ASTM D542-50, using a Bausch & Lomb Abbe-3L refractometer.
[i]Percent transmittance was determined in accordance with ASTM D 1003, using a Hunter Lab model D25P-9 colorimeter employing a Lumen C light source.
[j]Yellowness Index was determined in accordance with ASTM D 1925-70, using a Hunter Lab model Color Quest 2 colorimeter employing a Lumen C light source.
[k]Young's Modulus (GPa) was determined, using a Fischer Scope H-100 instrument, in accordance with the instrument manufacture's instructions. Smaller Young's Modulus values indicate improved flexibility.

The data of Table 3 shows that polymerizates obtained from initiated polymerizable monomer compositions of the current invention have enhanced flexibility relative to polymerizates obtained from homopolymers of methyl methacrylate.

EXAMPLES 4–6

Sheets, 0.32 cm thick, were cast from initiated polymerizable monomer compositions having the same compositions as described in Table 1 using glass molds having interior dimensions of 15.24×15.24×0.32 cm, the preparative method described in the previous Example, and the cure cycle described in Table 2. The cast sheets were cut into 40×40×32 mm test squares which were then imbibed with a combination of 3,3-di(4-methoxyphenyl)-13-hydroxy-13-(1-methylethyl)-indeno[2,1-f]naphtho[1,2-b]pyran, and 2,2-diphenyl-5-(ethoxycarbonylmethoxy carbonyl)-8-methyl-[2H]-naphtho-[1,2-b] pyran as follows: Resin solutions of the photochromic substances were spin coated onto one side of each test square. The coated test squares were then allowed to dry under an infrared lamp for 20 minutes followed by heating for 1 hour in a forced air oven set at 135° C. The imbibed test squares were then removed from the oven and allowed to cool to room temperature. The imbibed test squares were then thoroughly washed with 32° C. water, followed by wiping with acetone, to remove the resin solution.

Photochromic performance data for the imbibed test squares were determined through use of an optical bench. Prior to testing on the optical bench; the imbibed test squares were exposed to 365 nanometer ultraviolet light for about 20 minutes to activate the photochromic compounds and then placed into a 75° C. oven for about 20 minutes to bleach or inactivate the photochromic compounds. The imbibed test squares were then cooled to room temperature, exposed to fluorescent room lighting for at least 2 hours and then kept covered for about 16 hours prior to testing on an optical bench maintained at 23.9° C.

The optical bench was equipped with a 300 watt Xenon arc lamp operated at about 270 watts, a remote controlled shutter, a 3 mm KG-2 cut-off filter which removed short wavelength radiation and simulated solar radiation, 1.33 neutral density filter(s) which attenuated the ultraviolet light, and a 29.4° C. constant temperature water bath in which the test square was immersed. A collimated beam of light-from a tungsten lamp was passed through the test square at a small angle to the normal of the surface of the test square. After passing through the test square, the light from the tungsten lamp impinged a beam splitter which split the beam into two secondary beams of equal intensity. The reflected secondary beam was directed through a 480 nm band pass filter to a detector. The unreflected secondary beam was directed through a 620 nm band pass photopic filter to a detector. The photopic filter passes wavelengths such that the detector mimics the response of the human eye. The output signals from the detector(s) were processed by a radiometer which delivered data to a computer. The following Table 4 lists photochromic performance data obtained from the test squares.

TABLE 4

| Photochromic Performance | | | |
|---|---|---|---|
| Example | 4 | 5 | 6 |
| Polymerizable Monomer Compositions According to Example | 1 | 2 | 3 |
| Test | | | |
| Net Absorbance[1] at 370 nm | 0.03 | 0.00 | 2.74 |
| $\Delta OD^m$ 30 seconds, (29.4° C.). | ND[2] | ND[2] | 0.233 |
| $\Delta OD^m$ 90 seconds, (29.4° C.). | ND[2] | ND[2] | 0.290 |
| $\Delta OD^m$ 5 minutes, (29.4° C.). | ND[2] | ND[2] | 0.315 |
| $\Delta OD^m$ 8 minutes, (29.4° C.). | ND[2] | ND[2] | 0.323 |

TABLE 4-continued

| Photochromic Performance | | | |
|---|---|---|---|
| Example | 4 | 5 | 6 |
| Polymerizable Monomer Compositions According to Example | 1 | 2 | 3 |
| Bleach Half Life $(t_{1/2})^n$ (seconds) | ND[2] | ND[2] | 30 |
| B/O Ratio° | ND[2] | ND[2] | 1.31 |

[2]ND= Not Determined. Test squares according to Examples 4 and 5 could not be imbibed to any appreciable extent, as evidenced by the small values obtained for Net Absorbance at 370 nm, and as such additional photochromic performance data relative to Examples 4 and 5 were not determined.
[1]Net Absorbance at 370 nm, (viz., absorbance of the imbibed test square in the bleached state minus the absorbance of the unimbibed test square) was determined at room temperature using a Varian Model Cary 3 spectrophotometer
$^m$Change in optical density ($\Delta OD$) was determined on the optical bench by inserting an imbibed test square, in the bleached state, into the sample holder, adjusting the transmittance scale to 100%, opening the shutter from the Xenon lamp to provide ultraviolet radiation to change the test square from the bleached state to an activated (i.e., substantially darkened) state, measuring the transmittance in the activated state, and calculating the change in optical density according the formula $\Delta OD$=log (100/% Ta) where % Ta is the percent transmittance in the activated state and the logarithm is to the base 10. The period of exposure to the ultraviolet light from the Xenon lamp at the time the percent transmittance is determined, and the temperature of the water bath, are both noted.
$^n$The Bleach Half Life $(T_{1/2})$ is the time interval in seconds for the absorbance of the activated form of the imbibed test square to reach one half the highest absorbance at 29.4° C. after removal of the source of activating light.
°The B/O Ratio is a measure of the optical density at 570 nm over the optical density at 470 nm. The respective optical density values are determined using the optical bench as described above.

The data of Table 4 shows that photochromic articles made from polymerizates of the present invention may be successfully imbibed with photochromic substances to produce articles that have good photochromic performance properties compared to polymerizates prepared from homopolymers of methyl methacrylate monomer.

The present invention has been described with reference to specific details of particular embodiments thereof. It is not intended that such details be regarded as limitations upon the scope of the invention except insofar and as to the extent that they are included in the accompanying claims.

We claim:

1. A polymerizable organic composition consisting essentially of:

(a) from 5% to 90% by weight based on the total weight of monomer components, of a first monomer component represented by the following general formula,

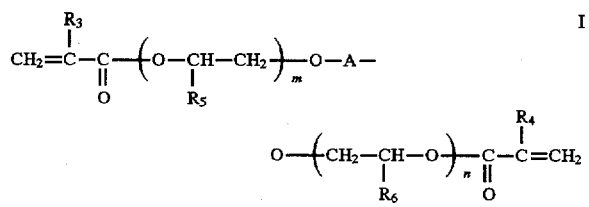

wherein m and n are each a positive number, the sum of m and n being from 15 to 70, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene, phenylene, $C_1$-$C_9$ alkyl substituted phenylene and a group represented by the following general formula,

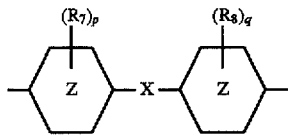

wherein, $R_7$ and $R_8$ are each $C_1$-$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —CH=CH—, —C($CH_3$)$_2$—, —C($CH_3$) ($C_6H_5$)— or

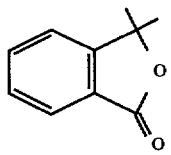

when

is the divalent benzene group, and X is O, S, —$CH_2$—, or —C($CH_3$)$_2$— when

is the divalent cyclohexane group;

(b) from 10% to 95% by weight, based on the total weight of monomer components, of a second monomer component represented by the following general formula,

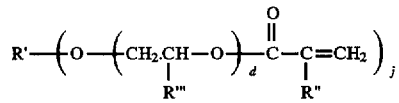

wherein R' is a radical derived from a polyol, R" is hydrogen or methyl, R''' is hydrogen or $C_1$ to $C_2$ alkyl, d is a number from 0 to 20, and j is a whole number from 3 to 6; and (c) from 0% to 85% by weight, based on the total weight of monomer components, of a third monoethylenically unsaturated monomer component that is polymerizable by free radical initiation.

2. The polymerizable organic composition of claim 1 wherein a polymerization moderator is also present in an amount from 0.01% to 20% by weight, based on the total weight of monomer components and said polymerization moderator.

3. The polymerizable organic composition of claim 2 wherein said polymerization moderator is selected from at least one of the group consisting of 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,3-diisopropenylbenzene, and mixtures of such polymerization moderators.

4. The polymerizable organic composition of claim 1 wherein a nonpolymerizable flexibilizing additive is also present in an amount of from 0.05% to 15% by weight, based on the total weight of the monomer components and said nonpolymerizable flexibilizing additive.

5. The polymerizable organic composition of claim 4 wherein the nonpolymerizable flexibilizing additive is selected from the group consisting of poly(alkylene glycol) dibenzoate, esters of phthalic acid, esters of isophthalic acid, esters of terephthalic acid, a member represented by the following general formula,

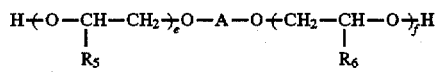

wherein e and f are each a positive number, the sum of e and f being from 0 to 70, $R_5$ and $R_6$ are each hydrogen or $C_1$ to $C_2$ alkyl, and A is a divalent linking group selected from the group consisting of straight or branched chain alkylene, phenylene, $C_1$-$C_9$ alkyl substituted phenylene and a group represented by the following general formula,

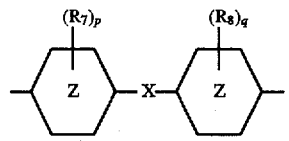

wherein, $R_7$ and $R_8$ are each $C_1$-$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —C($CH_3$)$_2$—, —C($CH_3$) ($C_6H_5$)— or

when

is the divalent benzene group, and X is O, S, —$CH_2$—, or —C($CH_3$)$_2$— when

is the divalent cyclohexane group, and mixtures of said nonpolymerizable flexibilizing additives.

6. The polymerizable organic composition of claim 1 wherein the sum of m and n is from 20 to 40, A is a divalent linking group represented by the following general formula,

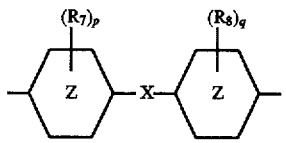

wherein

represents a divalent benzene group, the polyol from which R' is derived is trimethylolpropane, pentaerythritol or dipentaerythritol, and the third monomer component is an ester of acrylic acid, an ester of methacrylic acid or a combination of such esters.

7. The polymerizable organic composition of claim 6 wherein the sum of m and n is from 25 to 35, $R_3$ and $R_4$ are each methyl, $R_5$ and $R_6$ are each hydrogen, p and q are each 0, X is —$C(CH_3)_2$—, the polyol from which R' is derived is trimethylolpropane, R" is methyl, d is 0, j is 3, and the third monomer component is at least one monomer selected from the group consisting of methyl methacrylate, isobornyl methacrylate, phenoxyethyl methacrylate, cyclohexyl methacrylate and mixtures of such methacrylates.

8. The polymerizable organic composition of claim 7 wherein the amount of said first monomer component is from 10% to 80% by weight, and the amount of said second monomer component is from 20% to 90% by weight.

9. The polymerizable organic composition of claim 7 wherein the amount of said first monomer component is from 10% to 70% by weight, the amount of said second monomer component is from 10% to 80% by weight, and the amount of said third monomer component is from 10% to 80% by weight.

10. The polymerizate of claim 1.
11. The polymerizate of claim 7.
12. The polymerizate of claim 8.
13. The polymerizate of claim 9.

14. A photochromic article comprising:
(a) the polymerizate of claim 1; and
(b) a photochromic amount of an organic photochromic substance.

15. A photochromic article comprising:
(a) the polymerizate of claim 7; and
(b) a photochromic amount of an organic photochromic substance.

16. The photochromic article of claim 15 wherein the organic photochromic substance is selected from the group consisting of spiro(indoline)naphthoxazines, spiro(indoline) benzoxazines, benzopyrans, naphthopyrans, chromenes, organo-metal dithizonates, fulgides and fulgimides and mixtures of such organic photochromic substances.

17. A photochromic article comprising:
(a) the polymerizate of claim 8; and
(b) a photochromic amount of an organic photochromic substance.

18. A photochromic article comprising:
(a) the polymerizate of claim 9; and
(b) a photochromic amount of an organic photochromic substance.

19. The polymerizable composition of claim 6 wherein a polymerization moderator is also present in an amount from 0.1 to 10 weight percent, based on the total weight of monomer components and said polymerization moderator, said polymerization moderator being selected from the group consisting of 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,3-diisopropenylbenzene, and mixtures of such polymerization moderators.

20. The polymerizable composition of claim 8 wherein a polymerization moderator is also present in an amount from 0.1 to 10 weight percent, based on the total weight of monomer components and said polymerization moderator, said polymerization moderator being selected from the group consisting of 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,3-diisopropenylbenzene, and mixtures of such polymerization moderators.

* * * * *

UNITED STATES PATENT AND TRADEMARK OFFICE
CERTIFICATE OF CORRECTION

PATENT NO. : 5,739,243
DATED : April 14, 1998
INVENTOR(S) : Robert D. Herold et al It is certified that error appears in the above-indentified patent and that said Letters Patent is hereby corrected as shown below:

Column 16, claim 5 line 50

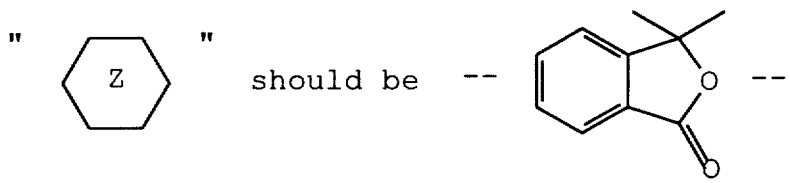

Signed and Sealed this

Twentieth Day of October, 1998

Attest:

BRUCE LEHMAN

*Attesting Officer*   *Commissioner of Patents and Trademarks*